(12) United States Patent
Dutta

(10) Patent No.: US 6,941,272 B2
(45) Date of Patent: Sep. 6, 2005

(54) CALCULATING COST DISCOUNTS FOR MOBILE PHONE INTERNET ACCESS

(75) Inventor: Rabindranath Dutta, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 623 days.

(21) Appl. No.: 09/882,175

(22) Filed: Jun. 14, 2001

(65) Prior Publication Data

US 2002/0194077 A1 Dec. 19, 2002

(51) Int. Cl.[7] ............................................. G06F 17/60
(52) U.S. Cl. ...................... 705/14; 705/26; 379/114.12
(58) Field of Search ................ 705/14, 26; 379/114.12

(56) References Cited

U.S. PATENT DOCUMENTS

| | | | | |
|---|---|---|---|---|
| 6,125,173 A | * | 9/2000 | Jagadish et al. | 379/114.1 |
| 6,615,034 B1 | * | 9/2003 | Alloune et al. | 455/406 |
| 6,804,337 B1 | * | 10/2004 | Anderson et al. | 379/114.06 |
| 2001/0034704 A1 | * | 10/2001 | Farhat et al. | 705/39 |
| 2002/0002504 A1 | * | 1/2002 | Engel et al. | 705/26 |
| 2002/0019238 A1 | * | 2/2002 | McDonnell et al. | 455/456 |

FOREIGN PATENT DOCUMENTS

EP  1150228 A1 * 4/2000 ........... G06F/17/60

OTHER PUBLICATIONS

PR Newswire, First quarter investments, Subscriber additions stenthen Metrocall's lead in messaging and data markets, May 5, 2000.*

* cited by examiner

Primary Examiner—Mark Fadok
(74) Attorney, Agent, or Firm—Duke W. Yee; Jeffrey S. LaBaw; Peter B. Manzo

(57) ABSTRACT

A method, program and system for calculating a cost discount for mobile telephone Internet access are provided. The invention comprises receiving an access request from a customer using a mobile phone and determining that the phone is using a wireless communication protocol (i.e. WAP). An electronic document (i.e. WML Web page) is sent back to the mobile phone. The session time is tracked, and if a customer purchase order is received, a discount is applied to the purchase price of the order.

18 Claims, 4 Drawing Sheets

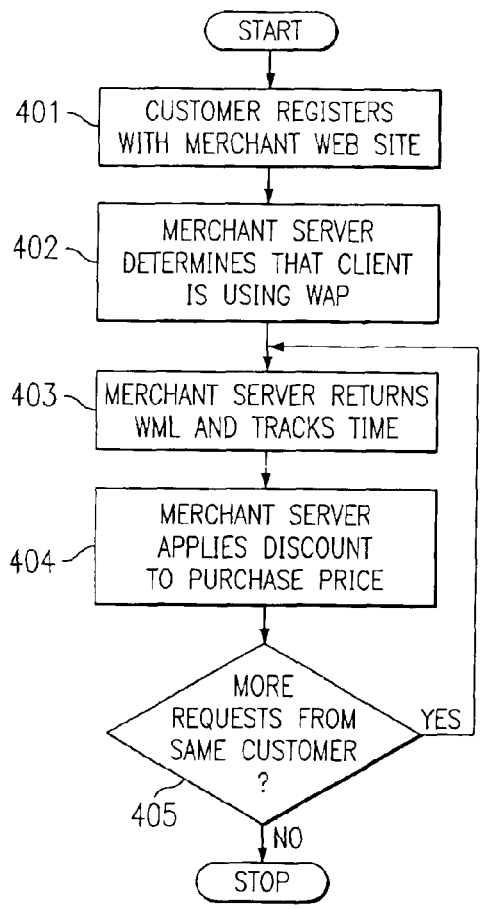
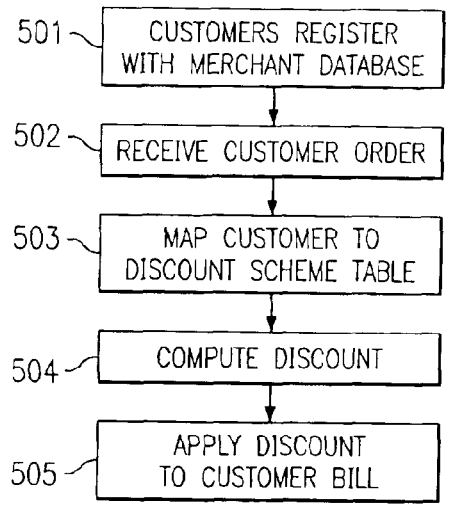
FIG. 6
| SESSION IDENTIFIER | SESSION TIME | COST CONVERSION FACTOR | DISCOUNT ON PURCHASE |
|---|---|---|---|
| IA36794 | 45 MIN | 10¢ PER MIN | $4.50 |
|  |  |  |  |

CALCULATING COST DISCOUNTS FOR MOBILE PHONE INTERNET ACCESS

BACKGROUND OF THE INVENTION

1. Technical Field

The present invention relates generally to computer network environments, and more specifically to mobile phone access via the Internet of electronic commerce sites.

2. Description of Related Art

Internet shopping via web-based cellular phone is not picking up very rapidly in the United States, primarily because of the high cost per minute Web access. Internet access via mobile phone adds costs to Web access that are normally not encountered with land line access. These additional costs provide a significant disincentive to use mobile phones for Internet shopping, by adding to the costs of purchases.

Some telecommunication plans do allow free web access over cellular phones to selected merchants (from whom telecommunication companies receives payment). However, the free web access is not extended to all merchants.

Currently, Internet merchants have to subscribe to discount plans offered by telecommunications carriers. These plans often allow cellular phone users to access the merchant sites for free. Cellular phone users might rely on a bookmark listing such discount/free merchant sites. However, the high costs of such special arrangements with the telecommunications carriers are only affordable to large, well-established Internet businesses.

Therefore, an affordable and flexible discount method for defraying the costs of cellular phone Internet shopping would be desirable.

SUMMARY OF THE INVENTION

The present invention provides a method, program and system for calculating a cost discount for mobile telephone Internet access. The invention comprises receiving an access request from a customer using a mobile phone and determining that the phone is using a wireless communication protocol. An electronic document is sent back to the mobile phone. The session time is tracked, and if a customer purchase order is received, a discount is applied to the purchase price of the order.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts a flowchart illustrating an application of a cellular phone discount in accordance with the present invention;

FIG. 5 depicts a flowchart illustrating the overall process flow of a cell phone discount by the merchant server in accordance with the present invention;

FIG. 6 depicts a diagram illustrating a discount computation mechanism in accordance with the present invention;

DETAILED DESCRIPTION OF THE PREFERRED EMBODIMENT

Figure 1:
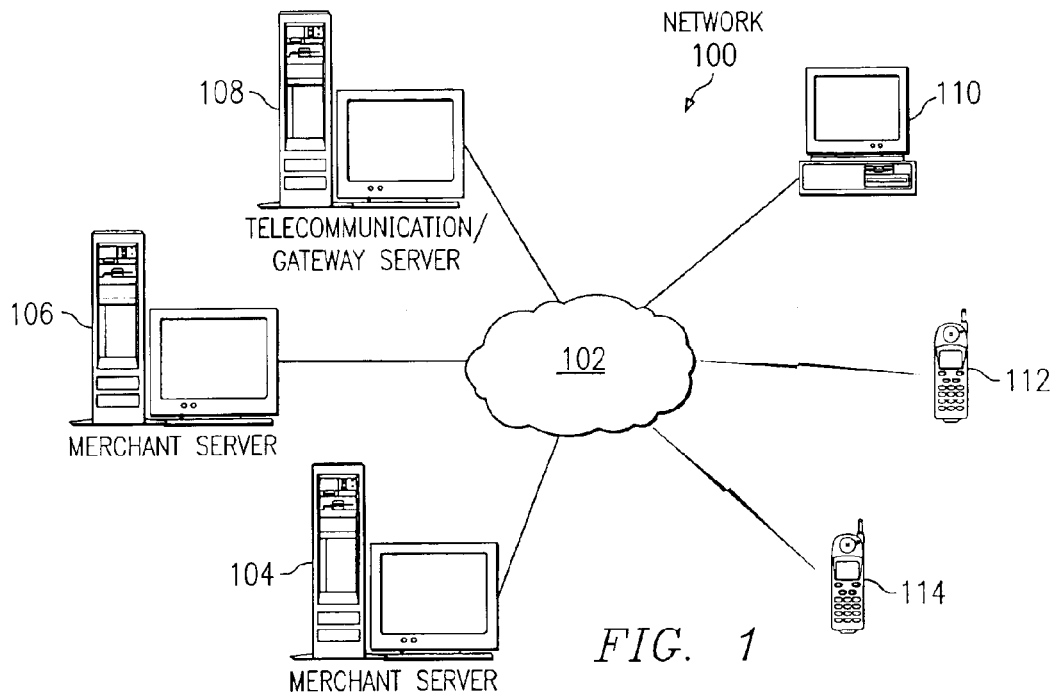
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include several types of connections, such as wire, wireless communication links, or fiber optic cables. However, for the purposes of the present invention, wireless communication links will be emphasized.

In the depicted example, server 104, 106, and 108 are connected to network 102. In the depicted example, servers 104 and 106 are merchant servers with high speed connections to network 102, while server 108 is a telecommunications/gateway server. In addition, clients 110, 112 and 114 also are connected to network 102. Client 110 is a personal computer using a conventional land line communication link. Clients 112 and 114 are mobile phones relying on wireless communication links. Clients 110, 112, and 114 are clients to servers 104, 106, and 108. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. FIG. 1 is intended as an example, and not as an architectural limitation for the present invention.

Figure 2:
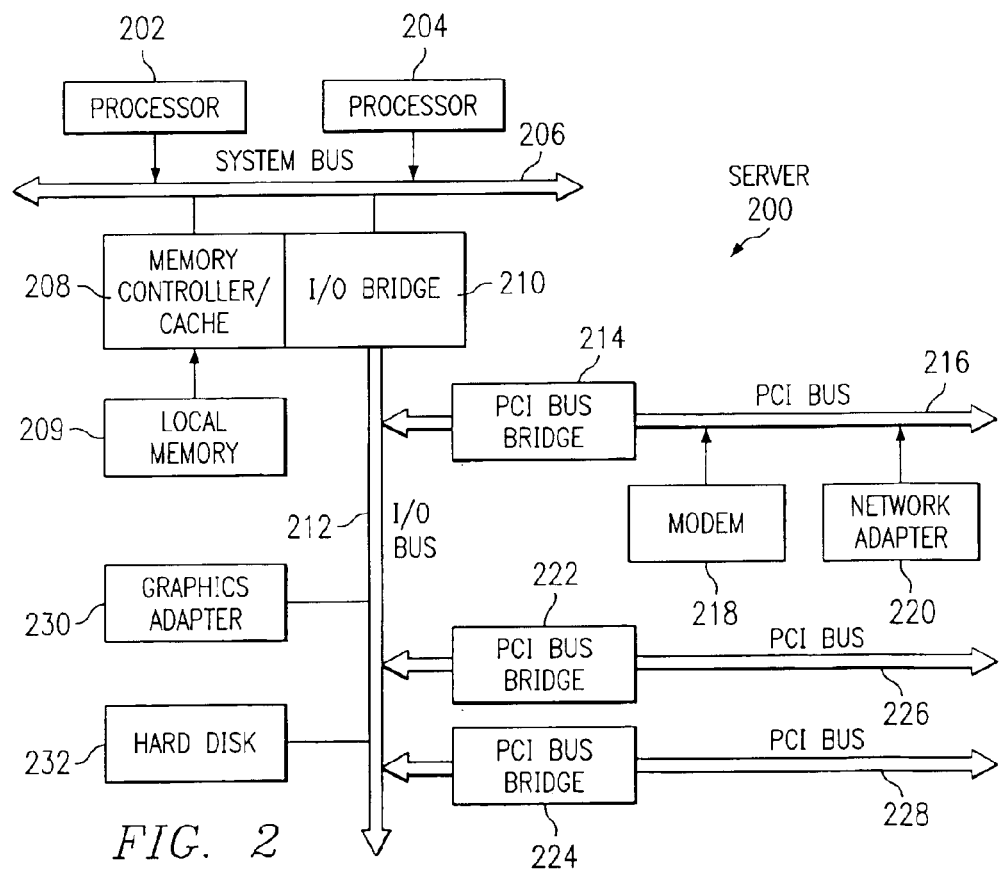
FIG. 2 depicts a block diagram of a data processing system that may be implemented as a server in accordance with a preferred embodiment of the present invention.

Referring to FIG. 2, a block diagram of a data processing system that may be implemented as a server is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to clients 110–114 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an eServer pSeries system, a product of International Business Machines Corporation in Armonk, N.Y., running the Advanced Interactive Executive (AIX) or Linux operating systems.

Figure 3A:
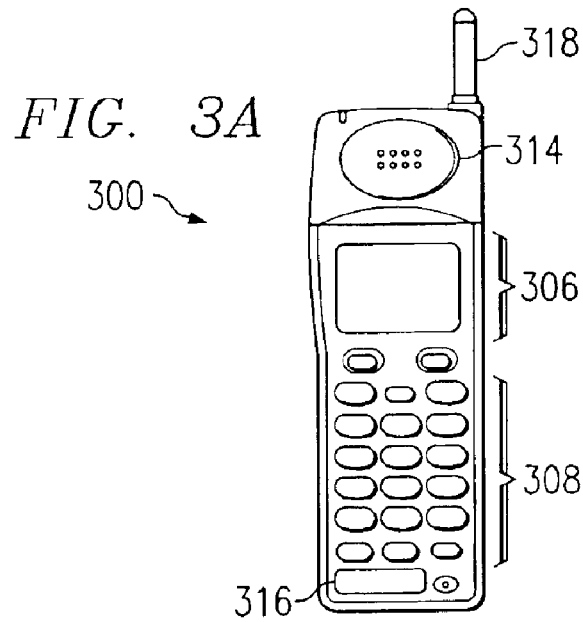
FIG. 3A depicts a diagram illustrating a mobile phone in accordance with a preferred embodiment of the present invention.

With reference now to FIG. 3A, a diagram illustrating a mobile phone is depicted in accordance with a preferred embodiment of the present invention. Mobile phone 300 includes a display 306 for presenting textual and graphical information. Display 306 may be a known display device, such as a liquid crystal display (LCD) device.

Mobile phone 300 may also include keypad 308, speaker 314, and microphone 316. The keypad may be used to enter, for example, telephone numbers, user identification information, and commands for interacting with the interface. Audio feedback may be presented via speaker 314. In addition to normal voice conversation, feedback may include other information, for example, location. Microphone 316 can be used not only for voice conversation, but for entering specific voice commands for voice actuated functions.

Mobile phone 300 also includes antenna 318, which is necessary for establishing wireless communication links with remote transmitting towers.

Figure 3B:
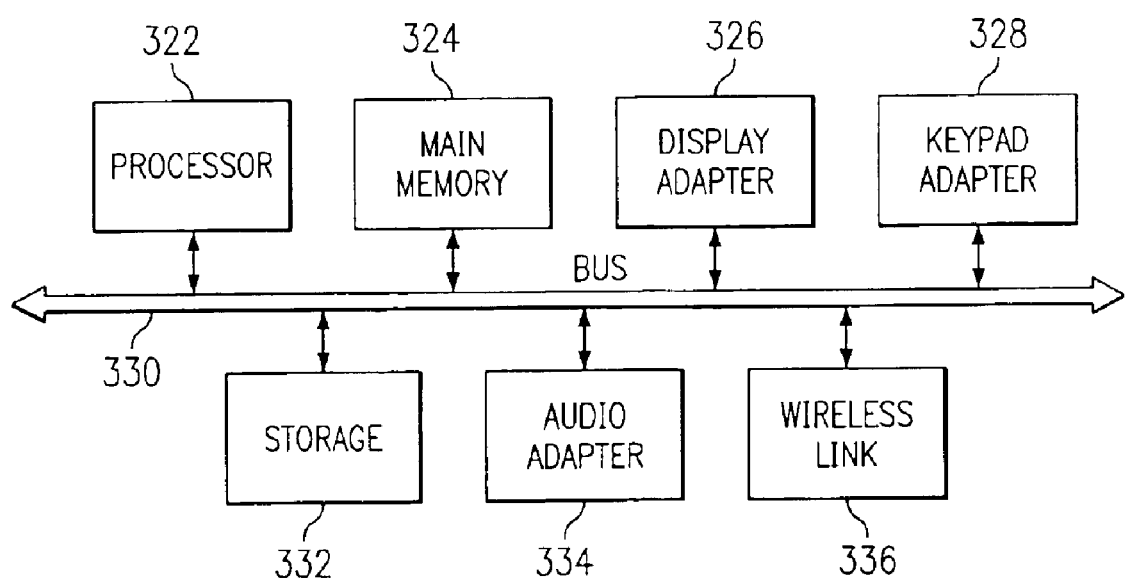
FIG. 3B depicts a block diagram illustrating the hardware configuration of a mobile phone in accordance with a preferred embodiment of the present invention.

Turning now to FIG. 3B, a block diagram illustrating the hardware configuration of mobile phone 300 is shown in accordance with a preferred embodiment of the present invention. FIG. 3B illustrates the increasing sophistication of modern mobile phone designs.

Mobile phone 300 employs bus architecture. Processor 322 and main memory 324 are connected to bus 330. Display adapter 326, keypad adapter 328, storage 332, and audio adapter 334 are also connected to bus 330. Mobile phone 300 also includes wireless link 336 connected to bus 330. Those of ordinary skill in the art will appreciate that the hardware in FIG. 3B may vary depending on the implementation. Other internal hardware or peripheral devices may be used in addition to or in place of the hardware depicted in FIG. 3B.

Mobile phone 300 may rely on Wireless Application Protocol (WAP) for facilitating communications. WAP is a standard for providing wireless phones, pagers and other handheld devices with secure access to e-mail and text-based Web pages. WAP provides a complete environment for wireless applications that includes a wireless counterpart of TCP/IP and a framework for telephony integration such as call control and phone book access. WAP features the Wireless Markup Language (WML), which was derived from Phone.com's Handheld Device Markup Language (HDML) and is a streamlined version of HTML for small screen displays. It also uses WMLScript, a compact JavaScript-like language that runs in limited memory. WAP also supports handheld input methods such as a keypad and voice recognition. Independent of the air interface, WAP runs over all the major wireless networks in place. It is also device independent, requiring only a minimum functionality in the unit so that it can be used with a myriad of phones and handheld devices. However, it should be pointed out that WAP has been described for illustrative purposes, and other wireless protocols may be used to implement the present invention.

The depicted example in FIG. 3B and examples described above are not meant to imply architectural limitations. In addition, the use of wireless communications protocols for Internet access need not be restricted to mobile phones. The present invention may be applied to other wireless devices which have similar communications protocols. Mobile phones are used merely for illustrative purposes.

The present invention provides a method for Internet merchants to apply discounts to cellular phone purchases. While prior art approaches rely on merchants subscribing to a discount plan offered by a telecommunications supplier, the present invention allows the merchant to offer discounts directly to the customer. This direct approach not only provides greater flexibility than subscribing to a centralized discount plan, but also opens opportunities for Internet merchants that might not otherwise be able to afford subscribing with the major telecommunications companies.

Referring to FIG. 4, a flowchart illustrating an application of a cellular phone discount is depicted in accordance with the present invention. The customer registers with an Internet merchant (step 401). Session identifiers may be used to track the customer (i.e. IDs embedded in cookies or Universal Resource Locator (URL) encoding). First time customer who have not registered with a merchant may be alerted by the merchant server that a discount may be applied to any purchases, which will provide further incentive for first time wireless customers who may not otherwise be aware of the potential savings. An email may also be sent to customers alerting them about possible discounts.

The merchant server determines that the customer's client (e.g. cell phone) is communicating over the WAP protocol (wireless communications)(step 402). This may be accomplished by detecting the type of browse used by the mobile phone, the type of header, or the presence of a WAP gateway. The merchant server then returns WML and also tracks the time the client spends at the web site (step 403). To reduce costs to consumers, and thereby encourage more cell phone web purchases, the time spent at a merchant's web site can be used to calculate discounts applied to purchases. In addition to time-based discounts, other discounting methods may be used to cover cellular phone costs. Examples of alternate discounts schemes include fixed rate per call and percentage of purchase price. Some merchants may wish to apply a ceiling to the discount. In addition, because different wireless communication plans may have different costs, greater discounts may be applied to higher priced plans. Examples of ways to determine the particular plan used by a customer (and hence relative costs) include: detecting the particular WAP gateway being used, the customer's wireless service provider, and customer profiles. Many other discount schemes are possible and should be determined according to merchant business needs.

When and if the customer makes a purchase from the merchant, a discount is applied directly to the purchase price, depending on the cost determination and discount method of the merchant (step 404). The system then determines if there are more requests from the same customer (step 405). An example would be a "continue shopping" command from the customer after placing the order. If there is another request, the system returns to step 403. If there are no more requests from the customer, the process stops and the system exits.

Turning to FIG. 5, a flowchart illustrating the overall process flow of a cell phone discount by the merchant server is depicted in accordance with the present invention. Customers register with a merchant database (step 501). This database in maintained on the merchant server and contains different types of registered customers. The criteria for classifying customers is determined by the business requirements of the merchant. For example, merchants may classify customers as business or professional customers, or they may classify customers according to the customer's wireless communication plan. Merchants might also classify customers according to the types of products the customers are interested in purchasing. These kinds of details can be gathered from the customers during the registration process in step 501, and may also be updated at a later date. In addition, the server might track repeat customers and apply greater discounts to regular customers, depending upon the customers' purchase histories.

When a customer contacts the merchant server or places an order (step 502), the merchant server maps the customer to a discount scheme table (step 503), depending on the customer's classification within the database. The discount scheme table may contain several discounting methods, similar to those described above. The different schemes may be applied to different customer classifications. Alternatively, the server may calculate which discount scheme will produce the greatest savings for the customer for a particular transaction.

After the customer/order is mapped to a particular discount scheme, the server uses the scheme to compute the discount for the transaction (step 504) and then applies the discount when calculating the customer's bill (step 505), as illustrated below in FIG. 6.

Referring to FIG. 6, a diagram illustrating a discount computation mechanism is depicted in accordance with the present invention. The example in FIG. 6 illustrates a time-based discount scheme. However, as stated above, other discount schemes may be used. The computation mechanism identifies a particular customer with the session and transaction. In the present example, the session identifier is 1A36794 (which is in the cookie). Because the present example is using a time-based discount scheme, the computation mechanism uses the total session time recorded by the server (45 minutes). The session time is then multiplied by a cost conversion factor (10¢ per minute), and the total discount ($4.50) is calculated and applied to the purchase price.

The discount schemes used by merchants might require a minimum total purchase, in order to make the discount services more cost effective for the merchants.

Figure 7:
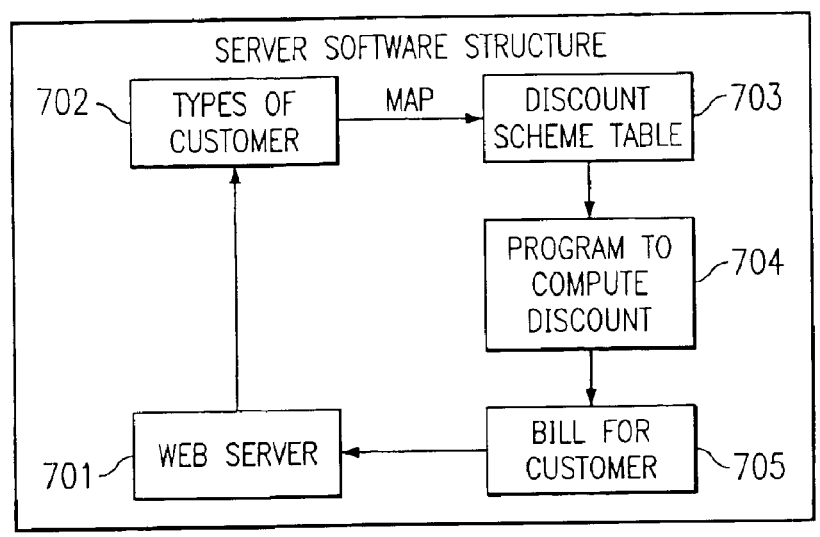
FIG. 7 depicts a diagram illustrating the software structure of a merchant server in accordance with the present invention.

Referring to FIG. 7, a diagram illustrating the software structure of a merchant server is depicted in accordance with the present invention. This diagram is an example of the types of software features used to carry out the method of the present invention. The merchant server contains Web Server software 701, which enables the server to communicate with other servers and client machines. Incoming requests coming through the Web Server software 701 are compared to a database 702 of types of customers. These types might include first time customers, repeat customers with registered accounts, business customers, or any type of classification that the merchant wishes to use, based on the nature of the merchant's business. The classification of customers may also be based on method of communication used by the customer in contacting the merchant. The explanation of the present invention assumes that the customer is using mobile or cellular telephone communication. However, there may also be possible sub-classifications with mobile communications.

The classification of the incoming customer request is then mapped to a table of discount schemes 703. Discount computation software 704 then calculates the discount based on the appropriate discount scheme. This discount is then applied to the purchase price by billing software 705.

Figure 8:
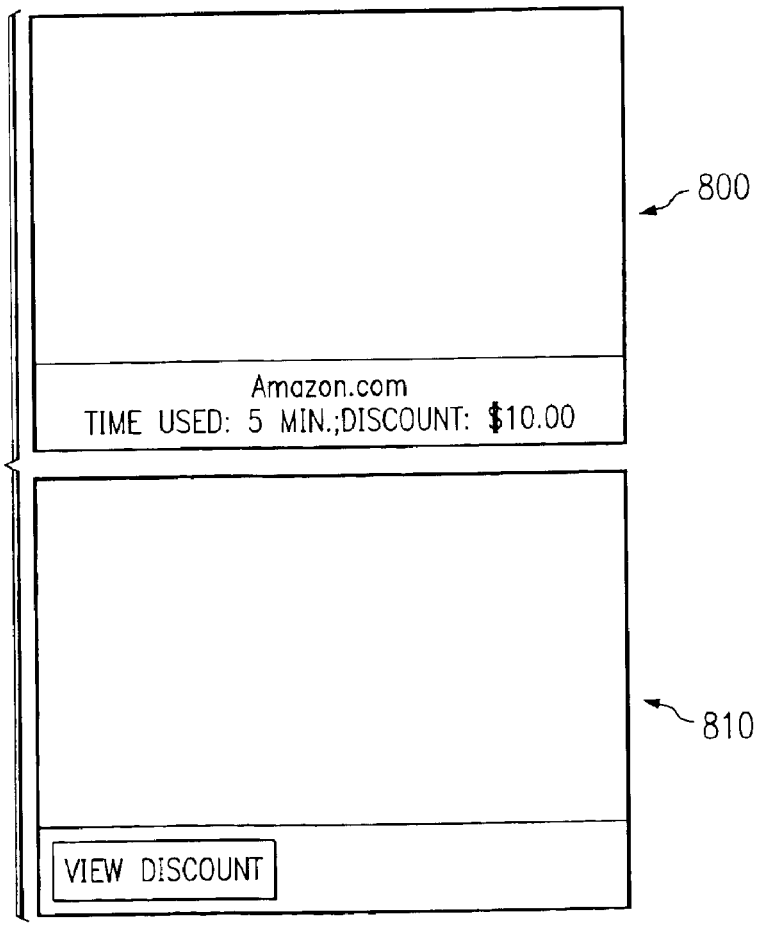
FIG. 8 depicts a pictorial diagram illustrating phone displays for discount information in accordance with the present invention.

Referring now to FIG. 8, a pictorial diagram illustrating phone displays for discount information is depicted in accordance with the present invention. The displays illustrated in FIG. 8 are merely possible examples of the type of discount display a customer might receive on his or her cell phone after an order is placed. Display 800 is an example of a detailed display identifying the merchant, the discount parameter (i.e. time), and the total discount on the order. In the example illustrated by display 810, a menu selection option is presented to the customer rather than detailed information.

Because wireless Internet purchases may be impulse and discretionary, an Internet merchant that discounts the cost of cell-phone access may find more visitors and recoup the cost of the discounts due to economies of scale from greater sales. By using the present invention, merchants will not have to pay the telecommunications carriers in order to provide free cell-phone access to the merchant web sites. This allows smaller merchants to avoid the often prohibitive costs of making special arrangements with the telecommunications firms.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. WAP and WML are used merely for illustrative purposes. Other markup languages (e.g. HDML) and communications protocols (e.g. bluetooth) may be used with the present invention.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for calculating a cost discount for mobile telephone Internet access, comprising:

a sever performing the following steps:

receiving an access request from a client machine;

determining that the client machine is using a wireless communication protocol;

sending an electronic document to the client machine;

receiving a customer purchase order; and applying a discount to a purchase price of the customer purchase order, based on the fact that the client machine was using the wireless communication protocol, wherein the step of applying a discount to the purchase price further comprises:

mapping a customer identifier to a discount scheme table; and computing a discount based on a discount scheme selected from the discount scheme table, and wherein the discount scheme table includes a plurality of discount schemes and wherein the discount is computed using a discount scheme from the plurality of discount schemes that produces greatest saving for the customer.

2. The method according to claim 1, wherein the wireless communication protocol is Wireless Application Protocol.

3. The method according to claim 2, wherein the electronic document sent to the client is a Wireless Markup Language document and contains product information and ordering instructions.

4. The method according to claim 1, wherein the discount scheme selected is based on a wireless communication plan used by a customer.

5. The method according to claim 1, wherein the discount scheme selected is based on a classification of a customer, and wherein the classification includes regular customers, and wherein a regular customer is determined based on a customer's purchase histories.

6. The method according to claim 4, wherein a greater discount is applied if the wireless communication plan used by the customer is a high-priced plan.

7. A computer program product in a computer readable medium for use in a data processing system, for calculating a cost discount for mobile telephone Internet access, the computer program product comprising:

instructions for receiving an access request from a client machine;

instructions for determining that the client machine is using a wireless communication protocol;

instructions for sending an electronic document to the client machine;

instructions for receiving a customer purchase order; and instructions for applying a discount to a purchase price of the customer purchase order, based on the fact that the client machine is using the wireless communication protocol, wherein the instructions for applying a discount to the purchase price further comprise:

instructions for mapping a customer identifier to a discount scheme table; and instructions for computing a discount based on a discount scheme selected from the discount scheme tables and wherein the discount scheme table includes a plurality of discount scheme and wherein the discount is computed using a discount scheme from the plurality of discount schemes that produces greatest savings for the customer.

8. The computer program product according to claim 7, wherein wireless communication protocol is Wireless Application Protocol.

9. The computer program product according to claim 8, wherein the electronic document sent to the client is a Wireless Markup Language document and contains product Information and ordering instructions.

10. The computer program product according to claim 7, wherein the discount scheme selected is based on a wireless communication plan used by a customer.

11. The computer program product according to claim 7, wherein the discount scheme selected is based on a classification of the customer, and wherein the classification includes regular customers, and wherein a regular customer is determined based on a customer's purchase histories.

12. The computer program product according to claim 10, wherein a greater discount is applied if the wireless communication plan used by the customer is a high-priced plan.

13. A system for calculating a cost discount for mobile telephone Internet access, comprising:

a first receiving component which receives an access request from a client machine;

a first processing component which determines that the client machine is using a wireless communication protocol;

a communications component which sends an electronic document to the client machine;

a second receiving component which receives a customer purchase order; and a second processing component which applies a discount to a purchase price of the customer purchase order, based on the fact that the client machine is using the wireless communication protocol, wherein the step of applying a discount to the purchase price further comprises:

a mapping component which maps a customer identifier to a discount scheme table; and a processing component which computes a discount based on a discount scheme selected from the discount scheme table, and wherein the discount scheme table includes a plurality of discount scheme and wherein the discount is computed using a discount scheme from the plurality of discount schemes that produces greatest savings for the customer.

14. The system according to claim 13, wherein the wireless communication protocol is Wireless Application Protocol.

15. The system according to claim 14, wherein the electronic document sent to the client is a Wireless Markup Language document and contains product information and ordering instructions.

16. The system according to claim 13, wherein the discount scheme selected is based on a wireless communication plan used by a customer.

17. The system according to claim 13, wherein the discount scheme selected is based on a classification of the customer, and wherein the classification includes regular customers, and wherein a regular customer is determined based on a customer's purchase histories.

18. The system according to claim 16, wherein a greater discount is applied if the wireless communication plan used by the customer is a high-priced plan.

* * * * *

UNITED STATES PATENT AND TRADEMARK OFFICE
CERTIFICATE OF CORRECTION

| | |
|---|---|
| PATENT NO. | : 6,941,272 B2 |
| APPLICATION NO. | : 09/882175 |
| DATED | : September 6, 2005 |
| INVENTOR(S) | : Dutta |

It is certified that error appears in the above-identified patent and that said Letters Patent is hereby corrected as shown below:

Col. 7, line 66: after "discount scheme" delete "tables" and insert --table--.

Col. 8, line 7: after "wherein" insert --the--.

Col. 8, line 12: before "and ordering" delete "Information" and insert --information--.

Signed and Sealed this

Twenty-second Day of August, 2006

JON W. DUDAS
*Director of the United States Patent and Trademark Office*